Oct. 31, 1967 L. W. SIMS ET AL 3,350,040
HIGH SPEED DECELERATION DEVICE
Filed Sept. 10, 1965 3 Sheets-Sheet 2
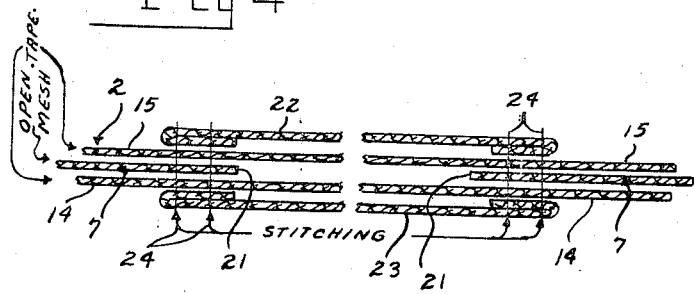
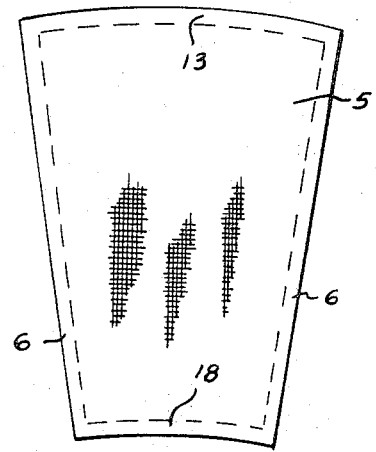
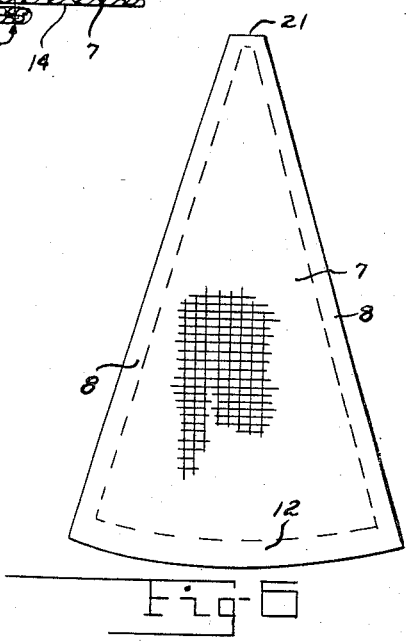
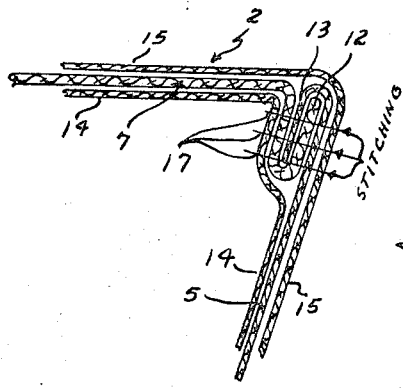
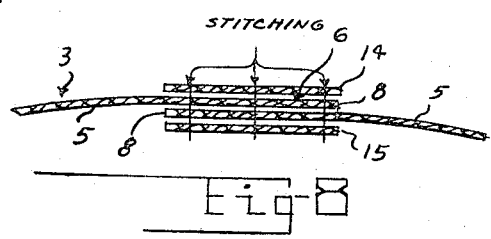
INVENTORS
LELAND W. SIMS
RAYMOND O. FREDETTE
BY
ATTORNEYS Oct. 31, 1967 L. W. SIMS ET AL 3,350,040
HIGH SPEED DECELERATION DEVICE
Filed Sept. 10, 1965 3 Sheets-Sheet 3
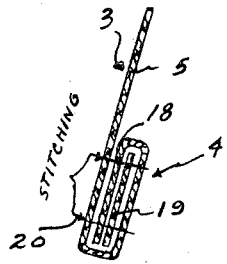
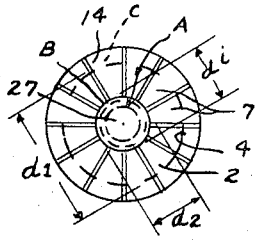
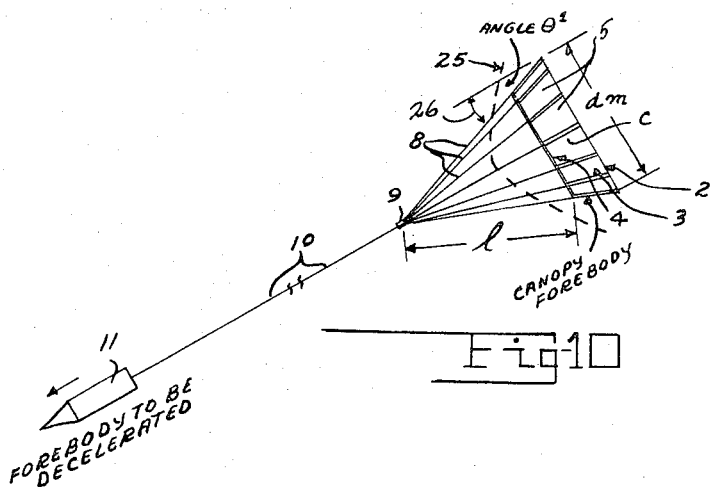
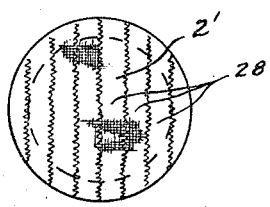
INVENTORS
LELAND W. SIMS
RAYMOND O. FREDETTE
BY
ATTORNEYS United States Patent Office 3,350,040
Patented Oct. 31, 1967

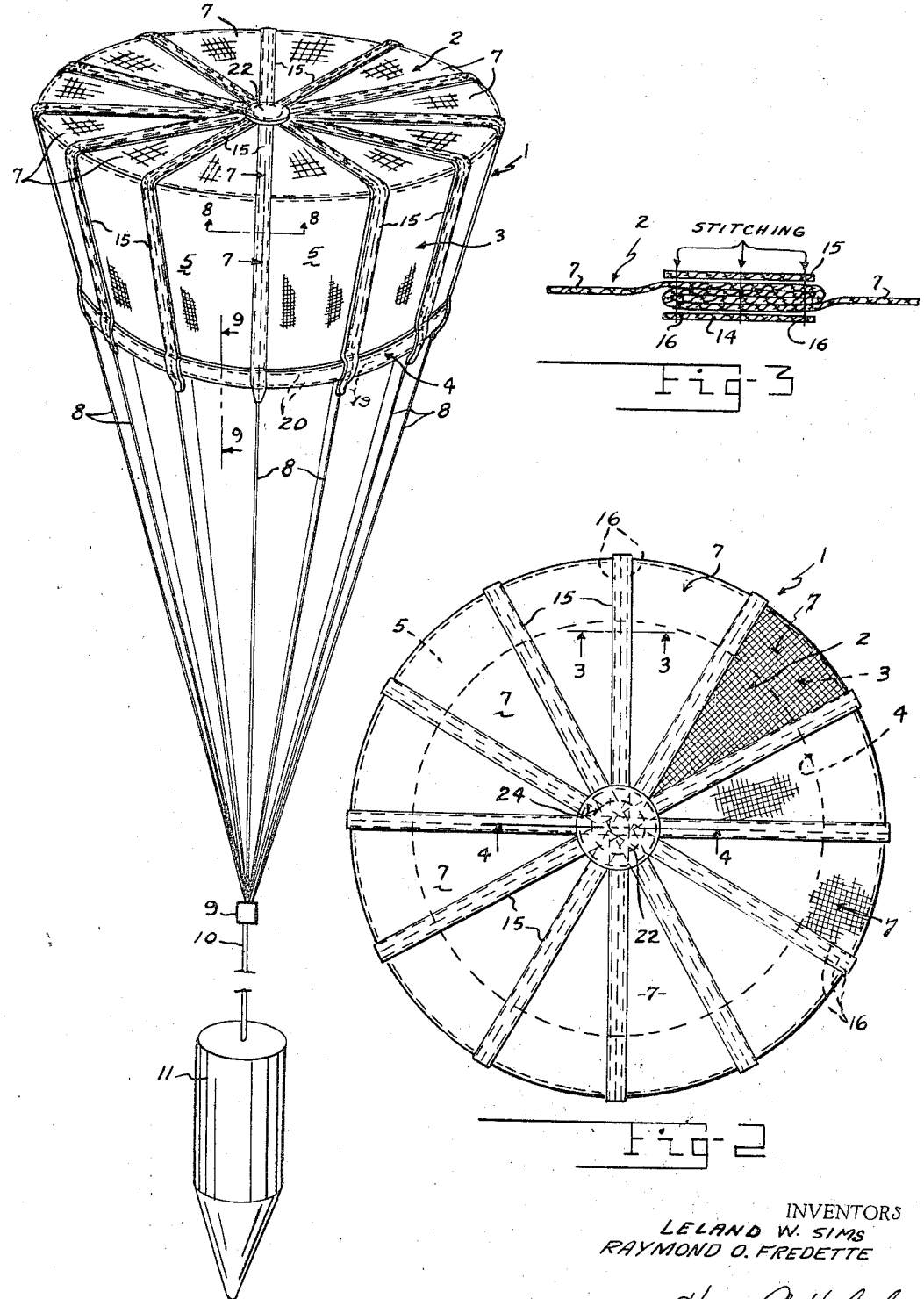

3,350,040
HIGH SPEED DECELERATION DEVICE
Leland W. Sims, Glenview, Ill., and Raymond O. Fredette, Birmingham, Ala., assignors to the United States of America as represented by the Secretary of the Air Force
Filed Sept. 10, 1965, Ser. No. 486,574
10 Claims. (Cl. 244—145)

ABSTRACT OF THE DISCLOSURE

A parachute deceleration device with a truncated canopy having a flat top of porous or open mesh material and a downwardly and inwardly tapered skirt portion of minimum porosity in which the angle between downward converging low porosity material of the skirt portion and the descent axis does not materially exceed 10 degrees, and the lengths of the shroud lines do not exceed about twice the diameter of the porous flat top portion.

---

This invention relates generally to parachute devices and more particularly to self-inflating decelerators having for an object means for the deceleration of a space vehicle or object descending through the atmosphere at high or supersonic speeds, comprising a flexible deceleration device having the capability of being packed readily in a small volume until its decelerating function is desired, having for a further object the provision of a simple self-inflating decelerator device while eliminates the necessity for artificial means for extension or inflation and will readily and quickly assume its geometric shape upon deployment in the air stream, and have minimum system weight and maximum compactness when packed or stowed.

A further object is the provision of a simple, relatively light weight easily packed decelerator device to provide efficient deceleration up through Mach 6.0.

A further object is the provision of a supersonic speed decelerator for objects and vessels traveling at supersonic speeds, which is flexible, compact, strong, has maximum stability against oscillation and fast self-inflating capability when deployed at high and supersonic speeds above the ground, particularly at high altitudes.

Many different types of decelerator configurations have been designed and used, some of which comprise inflatable devices (such as balloons) of various shapes which require relatively heavy pressurized vessels to supply an inflating gas, also mechanical drag plates or brakes which require complicated and heavy mechanisms, also internally-pressurized configurations which are relatively heavy compared even with conventional self-inflating parachutes, all being heavier, bulkier and less stable than the simple, stable supersonic decelerator device of the invention, all also requiring greater storage facilities, or heavier ejection or deployment mechanisms, and in addition these devices or configurations are usually limited to velocities of about maximum Mach numbers of 1.8 to 2.0 for efficient operation.

A further object of the invention is the provision of a decelerator device for supersonic speeds at least up to Mach 6, in the form of a truncated conical textile fabrication having a truncated conical annular forebody or guide surface skirt portion of minimum porosity and a flat top portion of very much greater porosity, in which the converging angular relation of the guide surface portion to the descent axis does not materially exceed about 10 degrees.

A further object of the invention is the provision of a small angle frustum cone canopy forebody which is constructed of extremely low porosity textile material with a flat roof of high porosity textile material, which may be constructed using an annular vent and composed of open mesh-type woven textile, whereby the forecone or canopy forebody is designed to provide maximum stabilizing effect due to its positive lift characteristics which compensate for the negative lift contribution of the flat porous roof, and the angle of the forecone is compatible with the incident flow direction resulting from the suspended forebody wake and canopy shock wave to maintain positive inflation at supersonic and high velocities through the atmosphere.

A further object of the invention is the provision of a high speed textile deceleration canopy having a flat roof of porous or open mesh type woven material and a downwardly converging truncated conical skirt portion of minimum to zero porosity, in which the taper of the conical portion does not exceed about 10 degrees to the descent axis, and the length of the shroud lines do not exceed about twice the diameter of the porous flat top portion.

A further object is the provision of a decelerator device for high supersonic speeds which includes a truncated conical forebody having a cone angle between near zero degrees to approximately 20 degrees, with a flat roof having a maximum diameter ratio to the inflation inlet diameter between 0.5 to 1.0, in which the exit area (based on geometric porosity) to inlet area is between 0.20 to 0.40 percent.

A further object is the provision of a truncated conical canopy having a flat porous roof or top in which the angle of the forecone is compatible with the incident flow direction resulting from the conical forebody wake and canopy shock wave, to maintain efficient inflation.

Other objects and advantages of the invention will become apparent from the following description and accompanying drawings in which like reference characters refer to like parts in the several figures:

Drawings

FIG. 1 is a somewhat schematic perspective view illustrating one form of deceleration device of the invention, showing canopy same fully inflated, depicting the flat porous roof and the truncated conical forebody of minimum porosity.

FIG. 2 is a plan view of the porous top or roof of the supersonic decelerator device employing segmental gores of open mesh textile or fabric.

FIG. 3 is an enlarged schematic sectional view, taken about on line 3—3 in FIG. 2.

FIG. 4 is also an enlarged schematic sectional view taken about on line 4—4 of FIG. 2, showing the reinforced central juncture of the gores or segments of the porous roof.

FIG. 5 is a detail plan view of one of the several gores or panels of minimum porosity of the conical truncated canopy forebody.

FIG. 6 is a plan view of one of the several segments of the more porous or open weave textile or fabric of the top or roof of the canopy.

FIGS. 7 and 8 are enlarged schematic sectional views, taken about on lines 7—7 and 8—8 respectively in FIG. 1, showing the reinforcing construction details between the edges of the roof segments and canopy forebody sections or panels.

FIG. 9 is an enlarged schematic detail sectional view taken about on line 9—9 of FIG. 1, showing the annular reinforcing construction details at the inlet end of the truncated conical forebody of the canopy.

FIGS. 10 and 11 are schematic detail side and top plan views of a textile flexible decelerator device employing a canopy having a nonporous truncated conical forebody or skirt and a flat top or roof of much greater porosity, employing a central vent, more particularly for use in indicating the relations of the various dimensions given in connection with a few examples of the model test decelerators, hereafter set forth in the specification.

FIGURE 12 is a top plan of the roof or top of a canopy fabricated from textile ribbons of suitable high porosity extending across the canopy and stitched together in overlapping relation along their edges.

In the drawings the numeral 1 denotes generally a supersonic decelerator device or canopy having a flat top or roof portion 2 and a truncated conical skirt portion 3, reinforced at its lower and smaller inlet end 4, reinforced somewhat after the manner shown in detail in FIG. 9.

The annular truncated forebody or cone frustum skirt portion 3 is preferably formed by segments or panels 5, as seen in FIG. 5, having a minimum to zero porosity textile material, and secured together in overlapping relation along their edges 6, as seen in detail in FIG. 8.

The flat roof or top 2 however, is preferably formed of pie shaped segments 7 which are secured together along their radial edges 8 in overlapping refolded interlocking relation as seen in FIG. 3. These top segments 7 are formed from suitable flexible textile material having very great porosity, such as open mesh textile fabrics, the mesh extending preferably parallel and transverse to the median line of each of the segments.

As shown, the decelerator device is fabricated from twelve panels 5 and twelve segments 7, and includes converging shroud or suspension lines 8 substantially as shown which are secured together, preferably to a swivel 9 which is attached to the riser or load suspension line 10 of suitable length attached at its other end to the forebody or load 11 to be decelerated. This load could be a space vehicle, missile, rocket, satellite or other vehicle or device.

The peripheral portions 12 of the segments 7 and the upper edges or borders 13 of the panels 5 are folded in interlocking relation, as seen in FIG. 7. These seams or overlapping junctures of the borders 8 of the roof segments or panels 7, as well as the overlapping borders 6 of the cone frustum panels 5, are reinforced inside and out by strong flexible reinforcing strips or tapes 14 and 15. Suitable strong stitching is provided through the tapes 14 and 15 and refolded overlapping panel and segment sections are indicated at 16 in FIGS. 3 and 8, while the peripheral juncture between the roof or top 2 and the truncated conical forebody or skirt 3 of the canopy are secured together by suitable strong stitching 17 as seen in FIG. 7. The inlet end 4 or lower edge of the canopy forebody 3, is folded at 18 around a strong annular reinforcing band or ribbon 19 and securely stitched therethrough as indicated at 20.

As shown, the reinforcing tapes or strips preferably cross at the center of the top, and the inner or apex ends 21 of the segments 7 are covered by circular reinforcing outer and inner strong textile disks 22 and 23, strongly stitched together by the circular stitching 24.

The shroud lines 8, of course, extend along the outside seams between the panels 5 and are securely stitched to the canopy and through the reinforcing tapes 14 and 15. The length of the shroud lines 8, as shown, is about twice the diameter of the top or roof 2 and preferably at the same angle as the conical frustum to the descent axis.

In FIG. 10 the reference numeral 25 indicates the shock wave preceding the decelerator 1 when the same is decelerating a body moving through space at supersonic speeds, the reference numeral 26 denoting the angular relation of the conic surface of the forebody to the descent axis of the decelerator.

While the canopy or decelerator 1 is shown in FIGS. 1 and 2 as having a fabricated solid top 2 of substantially maximum porosity, the canopy may be made with a central vent 27 which would increase the porosity or outlet relation area to the smaller inlet area at 4, as indicated in FIG. 11.

As shown in FIG. 12 the flat top or roof 2' of the decelerator may also be fabricated from textile ribbons 28 of suitable high porosity stitched together in overlapping relation along their edges somewhat after the manner shown. Also the panels forming the truncated conical forebody may be fabricated from nonporous ribbons (not shown), suitably overlapped and secured or otherwise secured together to form the inlet gore layouts 5 of the desired shape (as shown in FIG. 5).

Referring now to FIGS. 10 and 11 for example, the small angle cone frustum canopy forebody C, which is constructed of low porosity textile material, and the flat roof of high porosity may be constructed with an annular vent A constructed of high porosity material such as mesh-type weave. This annular vent A may encompass the entire roof ($d^i = d^m$).

The forecone C is designed to provide a stabilizing effect due to positive lift characteristics which compensate for the negative lift contribution of the flat roof. The angle 26 of the forecone ($\theta^1$) must be compatible with the incident flow direction resulting from the forebody wake and canopy shock wave 25 to induce and maintain inflation.

The annular vent ($d^m$) provides for the necessary exit to inlet area for the air flow through the canopy. In order to attain full inflation of the canopy at a given Mach number a maximum exit to inlet area ratio is prescribed to prevent supersonic flow through the canopy. The canopy must choke the flow to maintain internal inflation pressures. An accurate balance must prevail as regards the critical exit to inlet area ratios for proper inflation as well as relative positive and negative lift contributions of the canopy forebody and roof for acceptable stability of the canopy with respect to its own center of gravity and to the point of suspension.

The inlet diameter ($d^1$) to the maximum diameter ($d^m$) ratio is high to provide maximum drag effectiveness of the configuration. It has been found that the drag of a parachute is proportional to the inlet area ($d^1$), other properties remaining the same. The suspension line length ($l$) should be approximately equal to twice the maximum diameter ($d^m$). The number of these shroud lines is arbitrary, twelve being shown.

Various acceptable ranges of certain design parameters allow for the success of this configuration at high supersonic speeds. For example, the canopy forebody cone angle ($\theta^1$) may be varied from near zero degrees to approximately 20°. The inlet to maximum diameter ($d^1$ to $d^m$) ratio may be varied from 0.5 to 1.0. The exit (based on geometric porosity) to inlet area may vary from approximately 0.20 to 0.40. The basic canopy forebody shape (cone-frustum) geometry is maintained in all configurations and structural details in the roof construction are designed in a specific case to maintain the exit to inlet area ratio within the specific range stated above.

Any type of textile material which has the desired properties of strength, flexibility and porosity, including woven metal fabrics, are applicable for use in the construction of the configurations. The environmental conditions prevailing in a given application will determine the specific material requirements.

For example, several small samples or models successfully wind tunnel tested from Mach 2.3 to Mach 4.65, and constructed of nylon materials in all components are noted as follows:

*One model*

$d^1 = 5.4$ inches
$\theta^1 = 10$ degrees
$d^m = 6$ inches
$d^1 = 3.0$ inches—inner diameter of vent (A) = diameter of roof center disk (B)
$d^2 = 4.8$ inches = outer diameter of vent (A)

Forecone (C) porosity = 2 percent
Vent (A) porosity = 35 percent
Disk (B) porosity = 2 percent
Suspension line length ($l$) = 12 inches Number of suspension lines=12
Exit to inlet area ratio=0.21

*Another model*

$d^m$=6 inches (max. dia.)
$d^1$=5.4 inches (inlet dia.)
$\theta^1$=10 degrees (cone angle)
$d^i$=0.0 inch (none)

Forecone (C) porosity=2 percent
Vent (A) porosity=32 percent
Disk (B) porosity=no disk employed
Suspension line length ($l$)=12 inches
Number of suspension lines=12
Exit to inlet ratio=0.42

As shown, the angular relation of the shroud lines 8 to the descent axis is the same as the angular relation of the cone frustum surface to the descent axis and the length of the skirt or forebody is less than three times the maximum radius and more than half the radius of the top of the canopy.

For purposes of exemplification, a particular embodiment of the invention has been shown and described to the best understanding thereof. However, it will be apparent that changes and modifications in the arrangement and fabrication of the structure may be resorted to without departing from the true spirit and scope of the invention as defined in the following claims.

We claim:

1. A supersonic deceleration device comprising a self-inflating flexible textile canopy having a flat porous roof portion, and a downwardly converging conical frustum shaped, substantially nonporous skirt portion converging downwardly therefrom at an angle not less than .5 degree and not more than 20 degrees to the descent axis of the canopy, and formed with a ratio of air outlet area through the roof portion to air inlet area into the nonporous skirt portion between 0.20 and 0.40, and load suspension lines converging downwardly from the skirt portion to the descent axis having a length substantially twice the diameter of the roof portion.

2. A supersonic speed decelerator device comprising, a self-inflating flexible textile canopy body having a truncated conical shape skirt portion of substantially low porosity converging downwardly to form a lower restricted air inlet opening, shroud lines converging downwardly from the canopy at the inlet opening end of said skirt portion having a length substantially equal to twice the diameter of the upper end of the skirt portion and converging to the descent axis of the canopy for suspension of a load therefrom on the descent axis, to be decelerated, a flat roof portion having a substantially greater porosity than the skirt portion secured to the upper edge of said conical shape skirt portion across the maximum diameter thereof, in which the angle of the truncated conical shape of the skirt portion to the descent axis of the canopy body is between 0.5 degree and 20 degrees, and the ratio of air outlet area from the canopy through the roof portion to the ratio of air inlet area into the inlet end of the skirt portion is between 0.20 and 0.40.

3. In a textile supersonic speed decelerator, a circular canopy having a flat porous roof, a downwardly converging nonporous conical frustum shape skirt portion extending therefrom having an air inflation inlet opening at the bottom thereof, a plurality of circumferentially spaced shroud lines converging downwardly therefrom to the descent axis for the suspension therefrom on the descent axis of a load to be decelerated, a load suspension line greater in length than the shroud lines connected to the juncture of the shroud lines at one end on the descent axis and adapted to be connected at its opposite end to the load to be decelerated, in which the maximum diameter of the skirt and roof portions is greater than the minimum diameter of the skirt portion, and the ratio of the air outlet area through the roof portion to the air inlet area into the skirt is between 0.20 and 0.40, and the distance between the roof portion and lower edge of the skirt portion is not less than one-half the radius of the roof portion, and not greater than the diameter of the roof portion.

4. A high speed deceleration flexible textile parachute canopy comprising, a flat porous roof portion and a nonporous cone frustum shape skirt portion converging downwardly therefrom having a conical taper angle of substantially 10 degrees relative to the descent axis of the canopy and an air outlet area ratio through the porous roof portion relative to air inlet inflation area into the skirt portion is between 0.20 and 0.40, shroud lines circumferentially spaced around the inlet area of the skirt portion and connected to the skirt portion, extending downwardly in substantially the same angular relation to the descent axis as the angular relation of the surface of the cone frustum shape of the skirt portion to the descent axis of the canopy, and means connecting the lower ends of the shroud lines together on the descent axis, for connection to a load to be decelerated.

5. A supersonic deceleration parachute for decelerating bodies traveling at supersonic speeds comprising, a flexible textile canopy having a substantially flat circular porous roof composed of open mesh woven textile, and an annular downwardly converging conical frustum skirt portion composed of substantially impervious flexible material formed with an inflation air inlet opening in the bottom thereof having a diameter equal to the diameter in which the ratio of the outlet area through the porous roof to the inflation inlet area into the nonporous skirt portion is not less than 0.20 and not more than 0.40, and the conic frustum angular relation to the descent axis of the canopy is substantially 10 degrees, and load suspension shroud lines converging downwardly from the lower edge of the conical frustum skirt portion at an angle of substantially 10 degrees to the descent axis, and the lengths of shroud lines are substantially equal to twice the maximum diameter of the porous canopy roof.

6. A deceleration canopy as set forth in claim 5, in which the length of the nonporous conical frustum shape skirt portion is substantially equal to one-half the radius of the roof portion.

7. In a high speed deceleration parachute, a stabilized canopy comprising a substantially flat circular porous roof composed of flexible open mesh textile material having substantially maximum porosity, a substantially nonporous flexible skirt of conical frustum shape converging downwardly from the periphery of said roof, and a plurality of load suspension shroud lines connected to and converging downwardly and inwardly from said skirt portion in substantially aligned relation to the surface of said conical frustum shape of said skirt portion.

8. A parachute as set forth in claim 7, in which the porous substantially flat roof comprises a plurality of similar radial segments secured together in overlapping relation along their radial edges and the open mesh of the textile material thereof extend parallel to and perpendicular to the median radial lines between the side edges of the segments, and a similar number of truncated wedge shaped substantially nonporous similar panels having equal angle side edges joined together in overlapping relation, having similar maximum widths equal to the widths of the peripheral portions of each of the porous segments to form said nonporous conical frustum skirt portion having the said overlapping portions thereof constituting seams therebetween disposed in alignment with the radial overlapping edges of the segments in the roof portion, an annular reinforcing band secured around the lower edge portion of the skirt portion, reinforcing tapes extending outwardly from the center of the roof portion along the inner and outer surfaces of the roof portion and downwardly along the inner and outer surfaces of the skirt portion in covering and overlapping relation to the overlapping segments and panel portions, and secured to the adjacent segments and panels through the said overlapping edge portions thereof.

9. In a parachute type supersonic decelerator device, a canopy body having a descent axis comprising a flat flexible textile roof portion having an annular open mesh vent opening having a porosity of between 16 and 45 percent, a downwardly and inwardly converging conical frustum shape flexible textile skirt portion secured to the periphery of the roof portion having less than 2.0 percent porosity, said skirt portion having a cone frustum angle relative to the descent axis between 2.0 and 12 degrees, and shroud lines fastened to and converging downwardly from the lower edge of the skirt portion to a common load suspension point on the descent axis below the canopy, said shroud lines having lengths substantially twice the maximum diameter of the roof portion, in which ratio of the air exit area through the roof portion to air inlet area into the bottom of the skirt portion is not less than .21 and not more than .50.

10. In a flexible textile parachute type supersonic decelerator device, a canopy body comprising a circular flat roof of high porosity comprising a central flexible textile disk of zero to very low porosity and an annular open mesh air outlet textile band of high porosity extending around said disk, connected at its inner periphery to the peripheral portion of said disk, an annular conical frustum skirt portion of zero to very low porosity converging downwardly from the periphery of the roof portion at an angle to the descent axis of the canopy at substantially 10 degrees to form a constricted air inlet opening into the bottom of the conical frustum skirt portion, shroud lines fixed to and converging downwardly and inwardly from the lower edge of the skirt portion at substantially 10 degrees to the descent axis, and a load suspension line which may be materially greater length than the length of the shroud lines secured to the shroud lines below the canopy on the descent axis at the point of convergence of the shroud lines for connection to a load to be decelerated, in which the porosity of the roof portion is between 20 and 40 percent, and the ratio of the air inlet area into the skirt portion to the air outlet area through the roof portion is between .20 and .40.

References Cited
UNITED STATES PATENTS

| | | | |
|---|---|---|---|
| 2,472,601 | 6/1949 | Mallory | 244—145 |
| 2,993,667 | 7/1961 | Cushman | 244—142 |

MILTON BUCHLER, *Primary Examiner.*

A. E. CORRIGAN, R. A. DORNON,
*Assistant Examiners.*